United States Patent
Kim et al.

(10) Patent No.: US 6,845,706 B2
(45) Date of Patent: Jan. 25, 2005

(54) BREAD MAKER WITH BAR CODE SCANNER

(75) Inventors: Chul Kim, Anyang (KR); Tae-Uk Lee, Suwon (KR); Han-Jun Sung, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 10 days.

(21) Appl. No.: 10/223,475

(22) Filed: Aug. 20, 2002

(65) Prior Publication Data

US 2003/0196557 A1 Oct. 23, 2003

(30) Foreign Application Priority Data

Apr. 22, 2002 (KR) ......................................... 2002-21847

(51) Int. Cl.[7] .............................. A47J 27/62; A47J 37/01
(52) U.S. Cl. ............................. 99/348; 99/353; 366/240
(58) Field of Search .......................... 99/348, 353, 325, 99/326, 329 R, 328; 206/219, 221; 366/240; 235/462.16, 462.19

(56) References Cited

U.S. PATENT DOCUMENTS

| 5,146,840 A | | 9/1992 | Hedenberg ................... 99/348 |
| 5,947,009 A | * | 9/1999 | Hedenberg ................... 99/348 |
| 6,328,212 B1 | * | 12/2001 | Metlitasky et al. .... 235/462.16 |

* cited by examiner

Primary Examiner—Reginald L. Alexander
(74) Attorney, Agent, or Firm—Staas & Halsey LLP

(57) ABSTRACT

A bread maker includes upper and lower rollers and a bar code scanner. The upper and lower rollers wind a mixing bag containing bread ingredients to form dough. The bar code scanner reads a bar code attached to the mixing bag so that, as the mixing bag is wound by rotation of the upper and lower rollers, the bar code scanner reads the bar code while being in contact with the bar code wound around one of the upper and lower rollers. The upper roller includes flat and arcuate portions. The flat portion is provided with an arcuate guide section to form a circular track together with the arcuate portion.

18 Claims, 14 Drawing Sheets

BREAD MAKER WITH BAR CODE SCANNER

CROSS-REFERENCE TO RELATED APPLICATIONS

This application claims the benefit of Korean Application No. 2002-21847, filed Apr. 22, 2002, in the Korean Industrial Property Office, the disclosure of which is incorporated herein by reference.

BACKGROUND OF THE INVENTION

1. Field of the Invention

The present invention relates generally to bread makers, and more particularly to a bread maker, which is equipped with a bar code scanner having an improved construction to correctly read a bar code attached to a mixing bag made of an elastic material.

2. Description of the Related Art

A bread maker is an apparatus that makes bread using a mixing bag containing bread ingredients. The bread maker automatically makes a variety of breads depending on types of bread ingredients.

FIG. 1 is a perspective view schematically showing an appearance of a conventional bread maker. As shown, the conventional bread maker includes a housing 1 to define the appearance of the bread maker and a door 2 mounted in front of the housing 1 to be selectively opened and closed. A display 3 is formed on front of the housing 1 to visually provide information to a user. Other parts used to make bread are mounted in the housing 1. A window 4 is formed in the door 2 to allow the user to see through the housing 1.

FIG. 2 is a perspective view schematically showing an internal structure of the conventional bread maker, which constitutes a bread making construction inside of the housing 1. As shown in FIG. 2, the internal structure of the bread maker includes a pair of frames 5 that are spaced apart from each other and oppositely arranged. A baking tray 6, upper and lower rollers 7 and 8, and a scraper 9 are interposed between the frames 5. Additionally, a pair of heaters 11 are mounted on an inner surface of the door 2 to bake bread ingredients in a form of dough with appropriately supplied heat.

The baking tray 6 forms a bread making space to accommodate a mixing bag 20 (see FIG. 2). The upper and lower rollers 7 and 8, respectively, hold the upper and lower ends of the mixing bag 20 to allow the mixing bag 20 to be raised and lowered so as to mix the bread ingredients and form dough. In order to help the upper and lower rollers 7 and 8 hold the mixing bag 20, a plurality of fixing protrusions 10 are formed on each of the upper and lower rollers 7 and 8.

A slit 9a is formed in a center of the scraper 9 so as to allow an upper portion of the mixing bag 20 to pass therethrough. Accordingly, when the mixing bag 20 is upwardly moved by a rotation of the upper and lower rollers 7 and 8, respectively, the mixing bag 20 is allowed to pass through the slit 9a but the bread ingredients are scraped downward so that they do not move upward. A slit 6a (see FIG. 4) having the same function as that of the slit 9a is formed in a center of the baking tray 6. Accordingly, when the mixing bag 20 is downwardly moved by the rotation of the upper and lower rollers 7 and 8, the mixing bag 20 is allowed to pass through the slit 6a but the bread ingredients are not allowed to move downward and remain in the baking tray 6 to form dough.

FIG. 3 is a perspective view showing the mixing bag 20 to be accommodated in the baking tray 6. As shown in FIG. 3, the mixing bag 20 is made of an elastic material, such as vinyl. Dry bread ingredients 21 are contained in the mixing bag 20. An inner bag 22 containing baking liquid is disposed in the mixing bag 20 to be mixed with the dry bread ingredients 21 to form dough. The dry bread ingredients 21 include grain powder, such as wheat flour, that is a principle material of bread. The inner bag 22 is ruptured when the mixing bag 20 is passed through the slit 9a (see FIG. 2) of the scraper 9, so that the baking liquid is mixed with the dry bread ingredients 21.

A plurality of fixing holes 23 are formed in the upper and lower portions of the mixing bag 20 to receive the fixing protrusions 10, thereby allowing the mixing bag 20 to be held by the upper and lower rollers 7 and 8, respectively. Additionally, a bar code 24 is attached to the mixing bag 20. The bar code 24 provides bread making information including material mixing time, roller rotating speed, leavening time and temperature, baking time and temperature, etc.

FIG. 4 is a sectional view showing a state in which the bar code 24 is read by the conventional bar code scanner 25 while the mixing bag 20 is held by the upper and lower rollers 7 and 8. As shown in FIG. 4, the mixing bag 20 is tightly held in such a way that the dry bread ingredients 21 contained in the mixing bag 20 are positioned in the baking tray 6, the upper and lower portions of the mixing bag 20 are passed through the slit 9a of the scraper 9 and the slit 6a of the baking tray 6, respectively, and the fixing holes 23 formed in the mixing bag 20 are fitted on the fixing projections 10 formed on the upper and lower rollers 7 and 8.

A conventional bar code scanner 25 configured to read the bar code 24 attached to the mixing bag 20 is positioned to be opposite to the upper roller 7 and spaced apart from the mixing bag 20 by a certain distance so as to face the bar code 24 attached to the mixing bag 20. Accordingly, before bread making starts, the bar code scanner 25 is activated and reads the bar code 24 attached to the mixing bag 20. That is, when the upper and lower rollers 7 and 8 are slowly rotated in a forward direction (in FIG. 4, in a clockwise direction), the upper portion of the mixing bag 20 is wound around the upper roller 7, and the bar code 24 attached to a surface of the mixing bag 20 is passed through the bar code scanner 25. Here, the bar code scanner 25 reads bread making information from the bar code 24.

Thereafter, according to the bread making information read by the bar code scanner 25, the upper and lower rollers 7 and 8 are rotated alternately in forward and reverse directions to form dough. The heaters 11 mounted on the internal surface of the door 2 are operated to bake the dough disposed on the baking tray 6.

However, in the conventional bread maker, the conventional bar code scanner 25 reads the bar code 24 in a non-contact way while being spaced apart from the bar code 24. Additionally, the bar code 24 is attached to the mixing bag 20 made of an elastic material. Thus, the mixing bag 20 is not flat but wrinkled when being upwardly moved by the rotation of the upper roller, thereby hindering the bar code scanner 25 from correctly reading the bar code 24. As a result, bread making is not correctly performed due to an inaccurate reading of the bar code 24, thus reducing reliability of the bread maker.

In addition, a non-contact type bar code scanner, which reads a bar code while being spaced apart from the bar code by a certain distance, requires a high manufacturing cost in comparison with a contact type bar code scanner, thus reducing a competitive power of products by employing such non-contact type bar code scanners.

SUMMARY OF THE INVENTION

Accordingly, it is an object of the present invention to provide a bread maker with a contact type bar code scanner, which is brought into direct contact with and reads a bar code.

Another object of the present invention is to provide a bread maker with a bar code scanner, which is stably brought into contact with a bar code by an improved construction of an upper roller, thus allowing the bar code to be correctly read by the bar code scanner.

Additional objects and advantages of the invention will be set forth in part in the description which follows and, in part, will be obvious from the description, or may be learned by practice of the invention.

The foregoing and other objects of the present invention are achieved by providing a bread maker including upper and lower rollers to wind a mixing bag containing bread ingredients to form dough. The bread maker also includes a bar code scanner to read a bar code attached to the mixing bag so that, as the mixing bag is wound by a rotation of the upper and lower rollers, the bar code scanner reads the bar code while being in contact with the bar code wound around one of the upper and lower rollers.

According to an aspect of the invention, the upper roller includes flat and arcuate portions. The flat portion is provided with an arcuate guide section to form a circular track together with the arcuate portion, so that the bar code is guided along the track provided on the upper roller, and brought into contact with and passed through the bar code scanner.

According to an aspect of the invention, the bread maker further includes a pad attached to the track to prevent wearing of the track caused by contact with a front end of the bar code scanner, and to absorb vibration caused by the rotation of the upper roller so that smooth contact is allowed between the bar code and the bar code scanner.

According to an aspect of the invention, the track is provided with a ring-shaped groove so that the bar code is brought into contact with the bar code scanner while being spaced apart from the upper roller by the groove.

According to another aspect of the invention, the bar code scanner includes a bar code reader to read the bar code. The bar code reader is provided at its front end with a tip to be brought into point contact with the bar code.

According to another aspect of the invention, the bar code scanner further includes a holder to accommodate and support the bar code reader, a bracket to accommodate the holder, and a guide cap disposed in front of the bar code reader to guide the bar code to the tip of the bar code reader.

According to yet another aspect of the invention, the bread maker further includes a coil spring interposed between the bracket and the holder so as to bias the bar code to be brought into tight contact with the upper roller.

BRIEF DESCRIPTION OF THE DRAWINGS

The above and other objects and advantages of the invention will become apparent and more readily appreciated from the following description of the preferred embodiments, taken in conjunction with the accompanying drawings of which:

FIGS. 10A and 10B are sectional views taken along line X—X of FIG. 9, in which FIG. 10A is a view showing a state in which the mixing bag with a bar code comes in contact with the upper roller that does not start to rotate, and FIG. 10B is a view showing a state in which the bar code attached to the mixing bag is brought into contact with the bar code scanner;

DETAILED DESCRIPTION OF THE PREFERRED EMBODIMENTS

Figure 5:
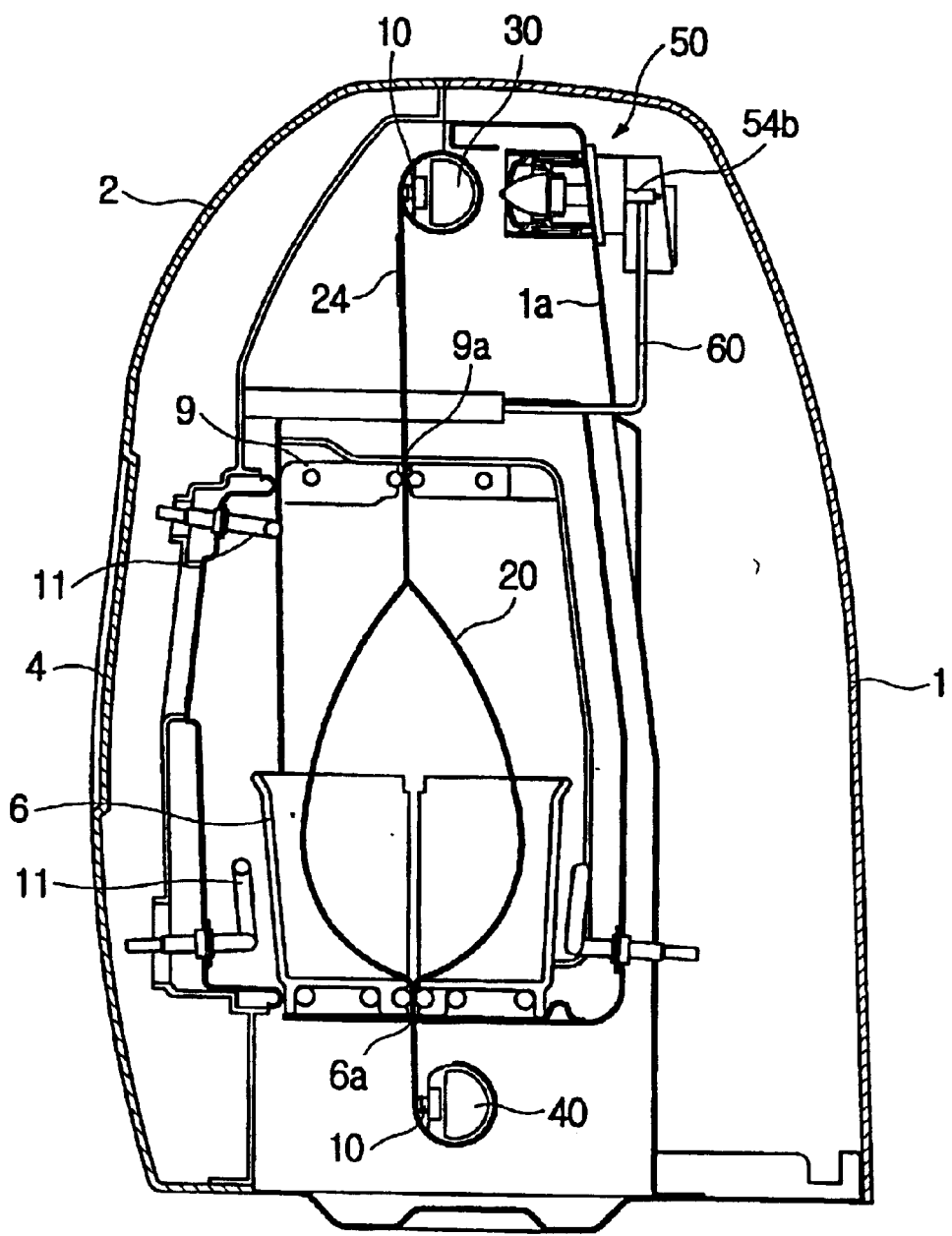
FIG. 5 is a sectional view showing a bread maker with a bar code scanner with its door closed, according to an embodiment of the present invention.
Figure 6:
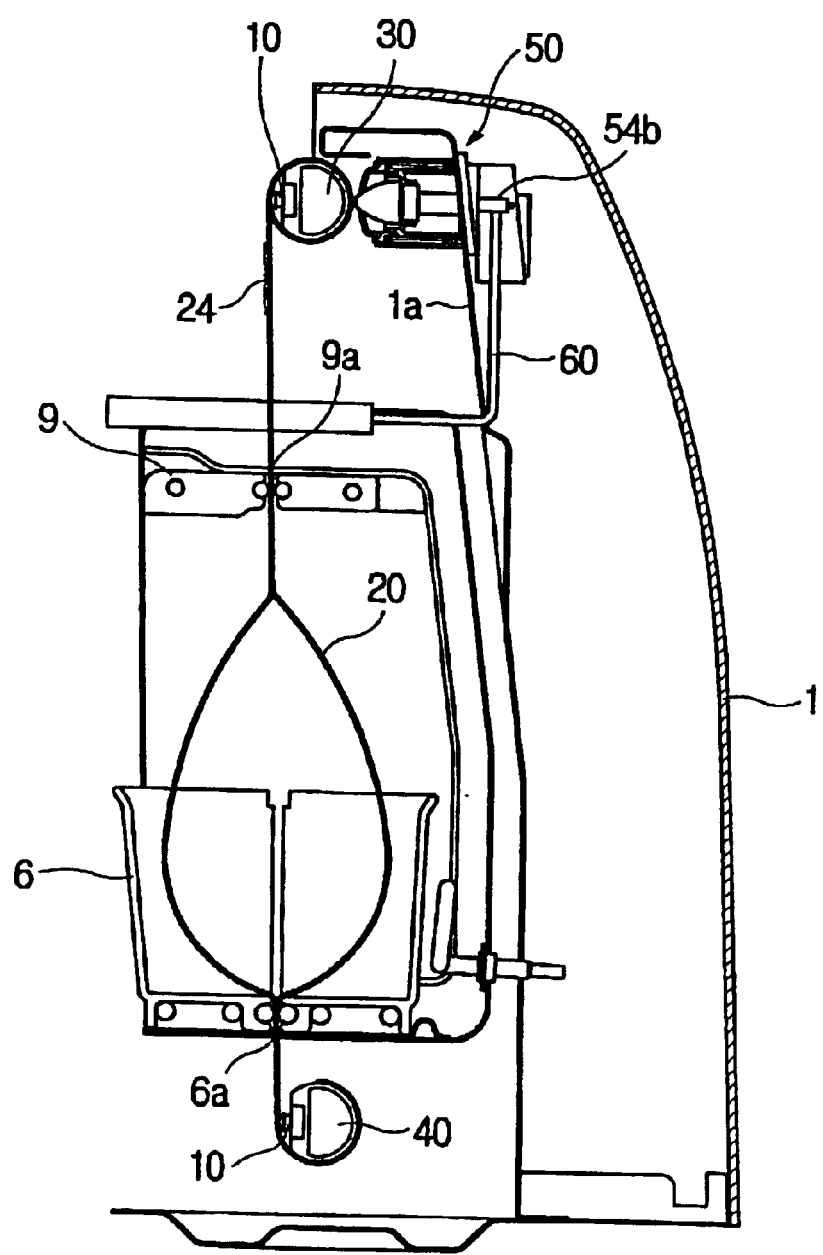
FIG. 6 is a sectional view of the bread maker of FIG. 5 with its door opened.

FIG. 5 is a sectional view showing a bread maker with a bar code scanner in with its door closed, according to an embodiment of the present invention. FIG. 6 is a sectional view of the bread maker of FIG. 5 with its door opened. As illustrated in FIGS. 5 and 6, the bread maker includes a housing 1 and a door 2. In the housing 1, a bread making operation is carried out. The door 2 selectively opens and closes a front of the housing 1, and is provided at its inside surface with a plurality of heaters 11. A baking tray 6, a scraper 9, an upper roller 30, a lower roller 40 and a bar code scanner 50 are provided in the housing 1. The scraper 9 is disposed over the baking tray 6. The upper roller 30 is rotatably positioned over the scraper 9, while the lower roller 40 is rotatably positioned under the baking tray 6. The bar code scanner 50 is disposed to be brought into contact with the upper roller 30.

An upper portion of a mixing bag 20, which contains bread ingredients and to whose upper surface a bar code is attached, is inserted into a slit 9a formed in a center portion of the scraper 9. Meanwhile, a lower portion of the mixing bag 20 is inserted into a slit 6a formed in a center portion of the baking tray 6. Additionally, upper and lower ends of the mixing bag 20 are inserted into and held by the upper and lower rollers 30 and 40, respectively. The upper and lower rollers 30 and 40 are rotated in both forward and reverse directions by an action of a belt that is rotated by a motor (not shown).

The bar code scanner 50 is fixedly attached to a rear plate 1a positioned in a rear portion of an interior of the housing 1 such that it is selectively brought into contact with and removed from the upper roller 30 by an action of a lever 60. The lever 60 is operated in conjunction with an operation of the door 2. The bar code scanner 50 may thereby be brought into contact with the bar code 24 by the rotation of the upper and lower rollers 30 and 40, respectively, in a forward direction.

As shown in FIG. 5, when the door 2 is closed, the lever 60 is moved rearward together with the door 2 to remove the bar code scanner 50 from the upper roller 30. On the other hand, as shown in FIG. 6, when the door 2 is opened, the lever 60 having an elastic restoring force is restored to its original position to bring the bar code scanner 50 into contact with the upper roller 30.

Figure 1:
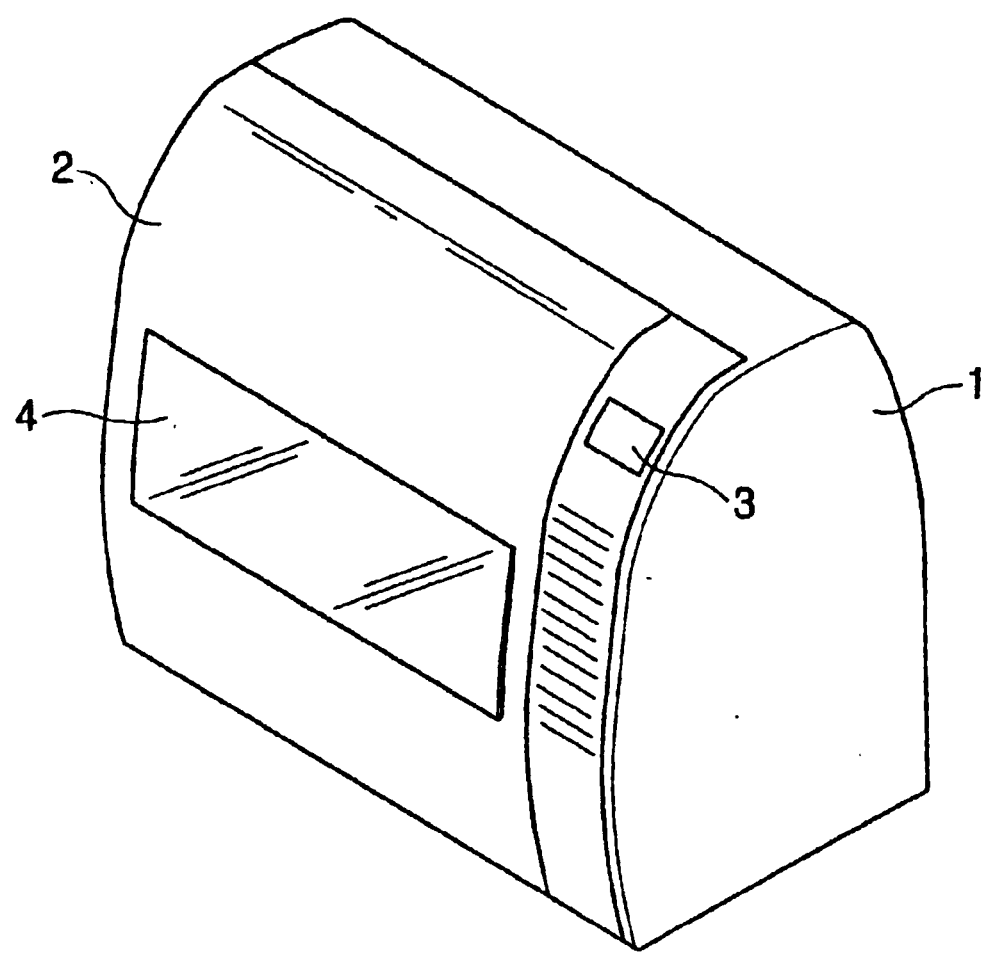
FIG. 1 is a perspective view schematically showing an appearance of a conventional bread maker.
Figure 2:
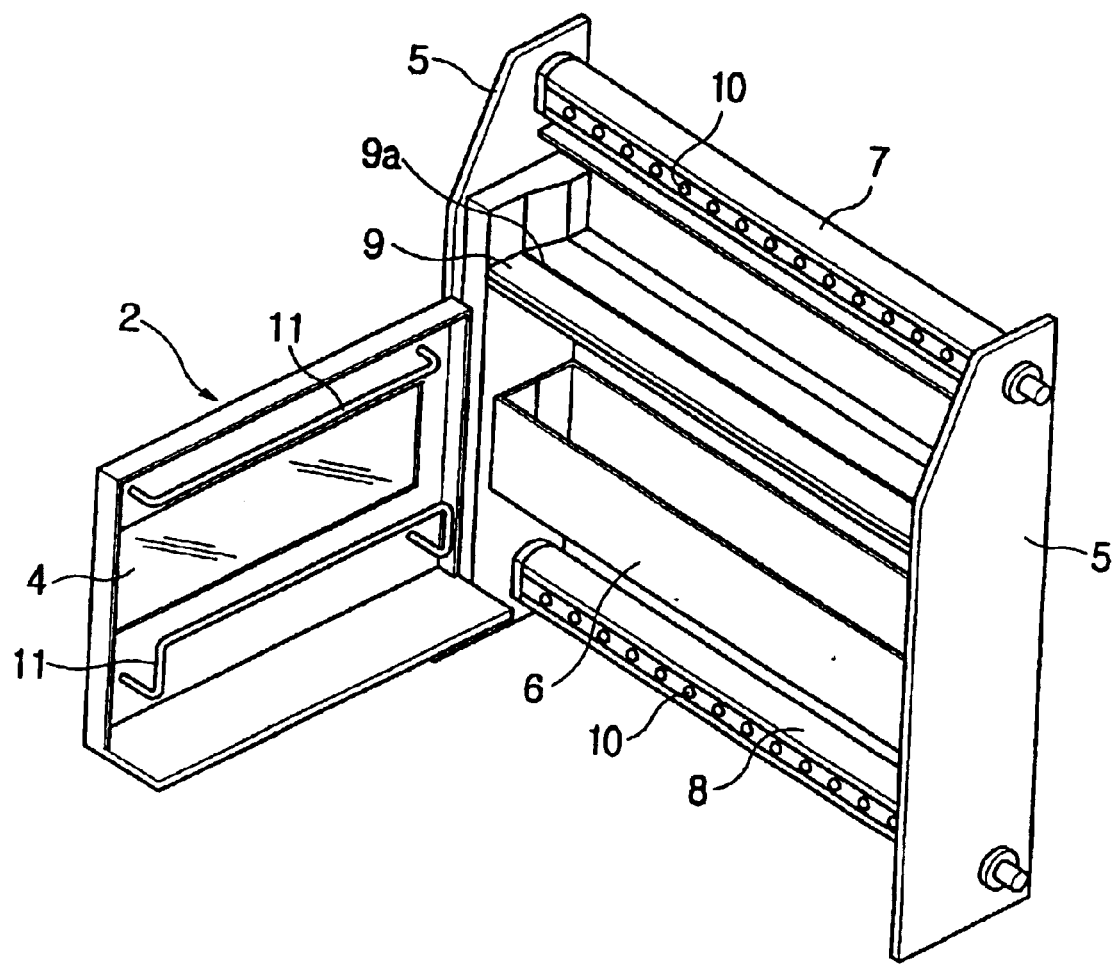
FIG. 2 is a perspective view schematically showing an internal construction of the conventional bread maker shown in FIG. 1.
Figure 3:
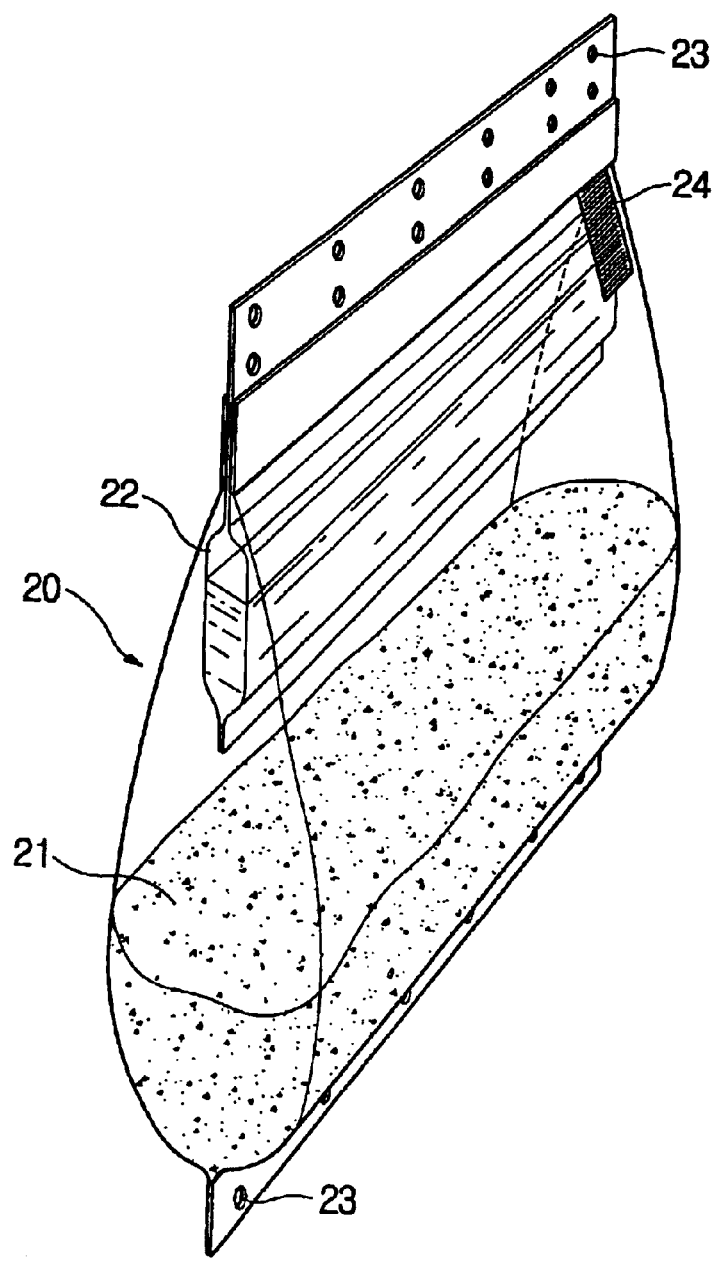
FIG. 3 is a perspective view of a mixing bag containing bread ingredients.
Figure 4:
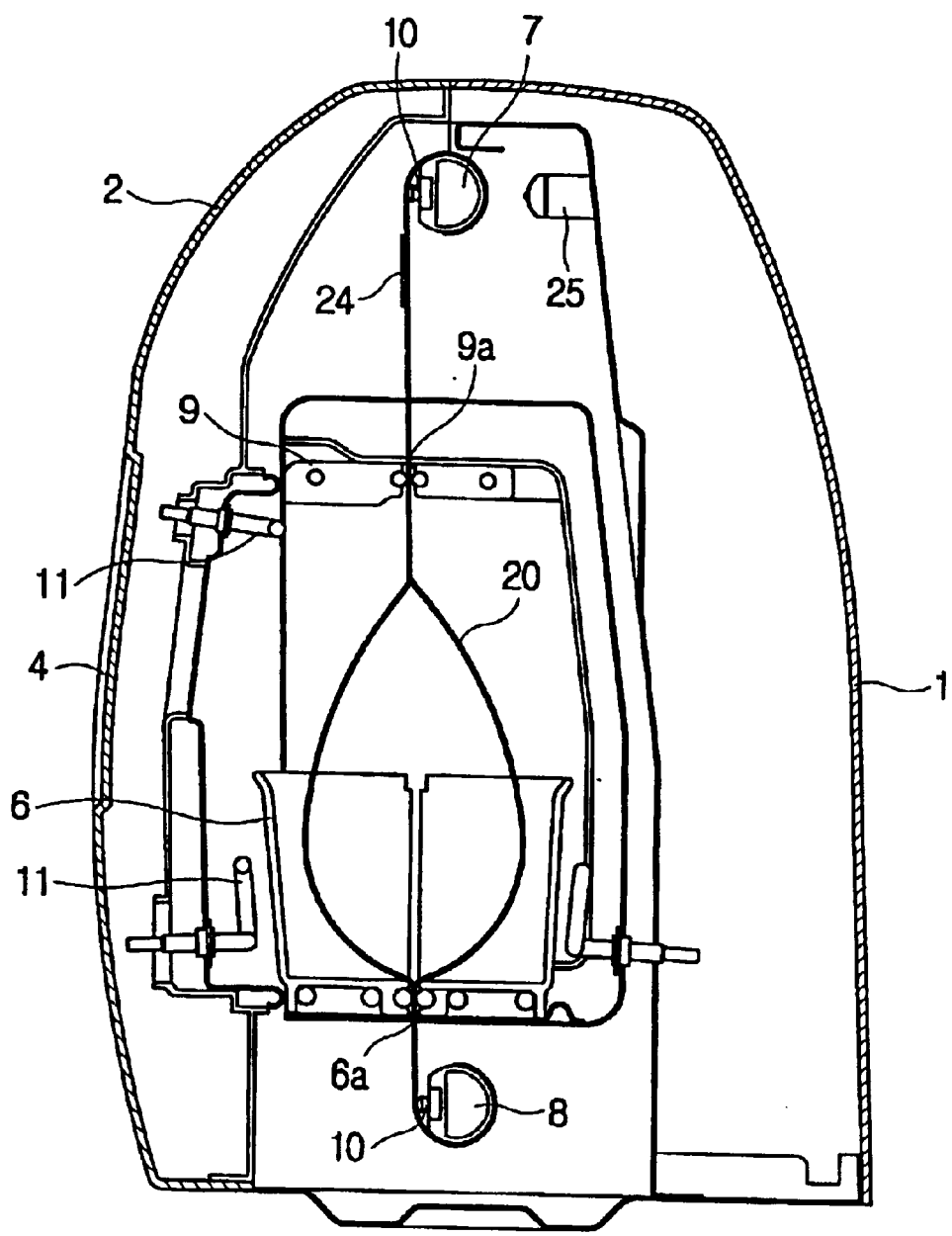
FIG. 4 is a sectional view showing a structure of a conventional bread maker with a conventional bar code scanner.

With the above-described construction, as the upper roller 30 is slowly rotated in a forward direction while the bar code scanner 50 is in contact with the upper roller 30 by the opening of the door 2 as shown in FIG. 6, the bar code scanner 50 reads the bar code 24 (see FIG. 3) attached to the mixing bag 20. When the door 2 is closed after the reading operation of the bar code scanner 50 is completed, dough is formed by the rotation of the upper and lower rollers 30 and 40 in both forward and reverse directions with the bar code scanner 50 removed from the upper roller 30 as shown in FIG. 3.

Figure 7:
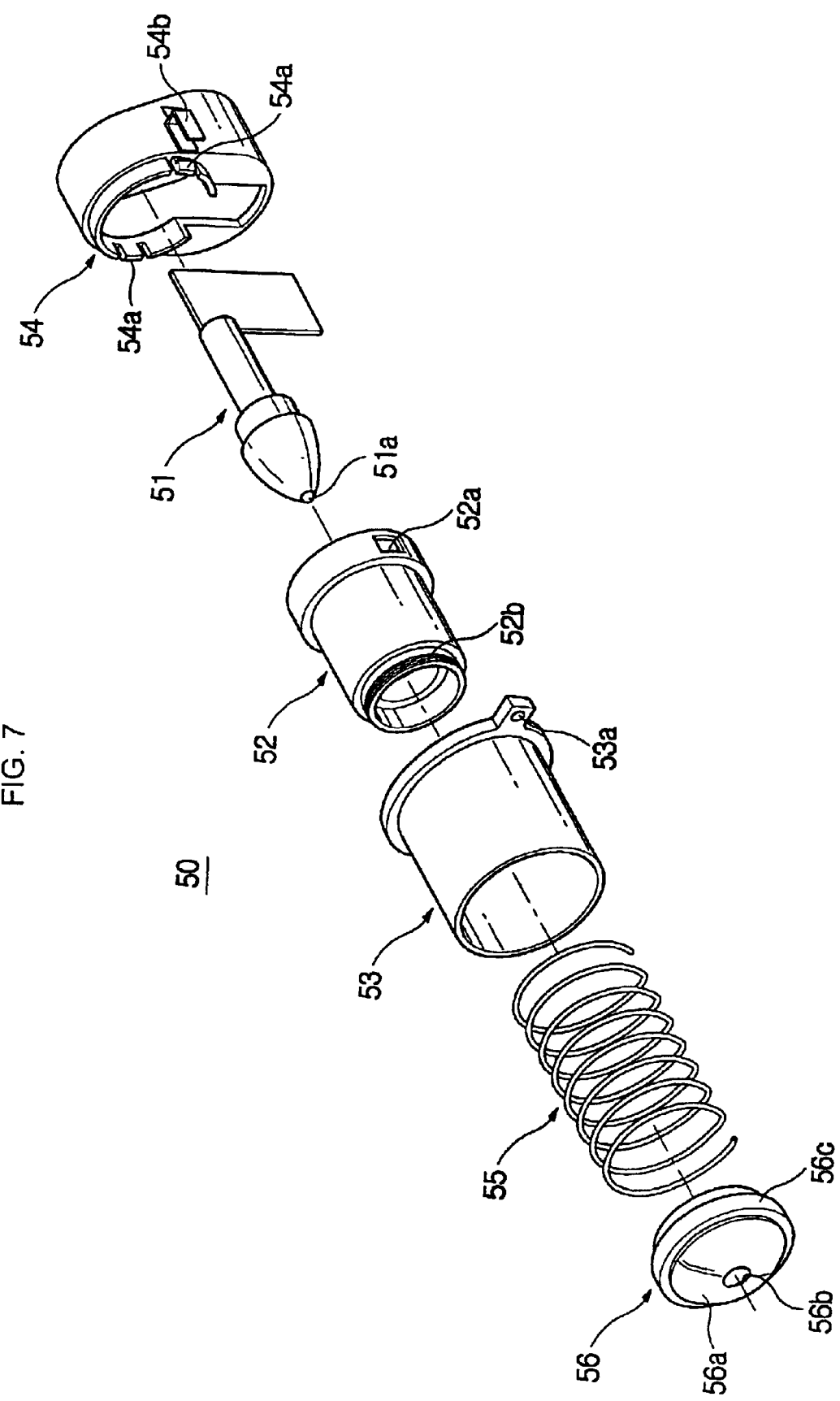
FIG. 7 is an exploded perspective view of the bar code scanner of the present invention used in the bread maker shown in FIG. 5.
Figure 8:
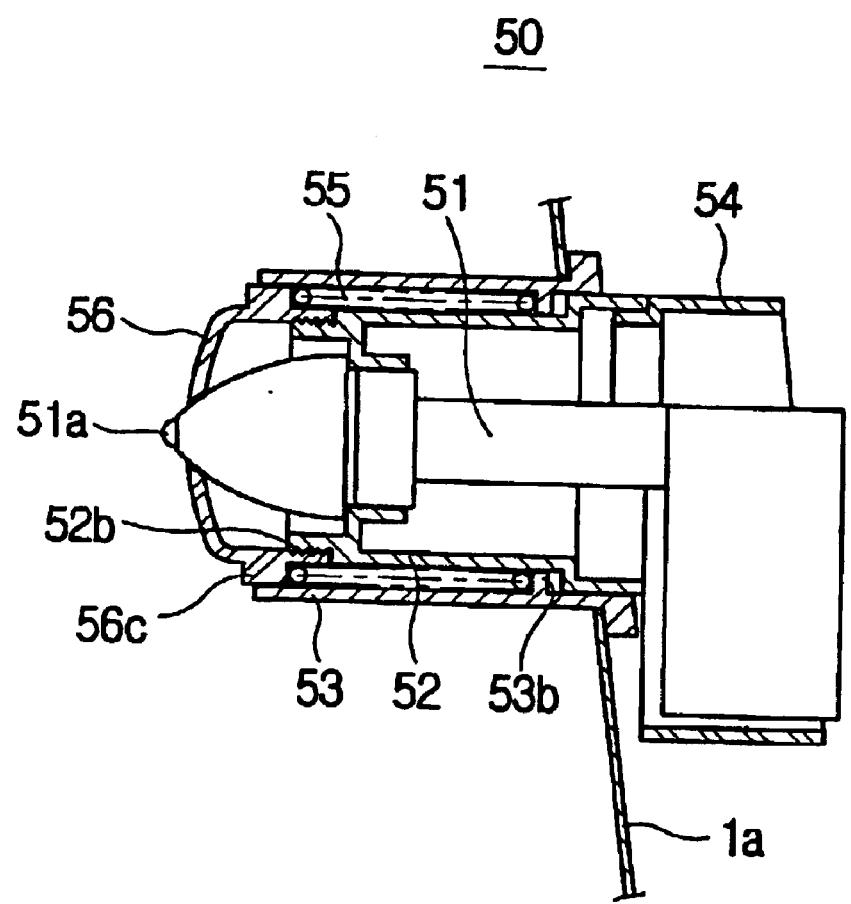
FIG. 8 is a sectional view of the bar code scanner of FIG. 7 assembled.

FIG. 7 is an exploded perspective view of the bar code scanner 50. FIG. 8 is a sectional view of the assembled bar code scanner 50.

Referring to FIG. 7, the bar code scanner 50 includes a bar code reader 51, a holder 52, a bracket 53 and a cover 54. The bar code reader 51 is provided at its front end with a tip 51a that is brought into contact with the bar code 24. The holder 52 has a hollow cylindrical shape, and accommodates and supports the bar code reader 51. The bracket 52 has a hollow cylindrical shape, and accommodates the holder 52 to be longitudinally moved a certain distance therein. The cover 54 is interlocked with a rear end of the holder 52 to protect a rear end portion of the bar code reader 51.

A pair of locking holes 52a are formed in the rear end of the holder 52 and a pair of locking projections 54a are formed on a front end of the cover 54 to be interlocked with the locking holes 52a, thereby combining the cover 54 with the holder 52. A plurality of screw holes 53a are formed in a rear end of the bracket 53, so screws (not shown) are tightened into the rear plate 1a (see FIG. 5) through the screw holes 53a, thus allowing the bar code scanner 50 to be fixedly attached to the rear plate 1a.

A coil spring 55 is interposed between the bracket 53 and the holder 52 inserted into the bracket 53 so that the holder 52 accommodating the bar code reader 51 is biased toward the upper roller 30 by an action of the coil spring 55 with the bracket 53 fixedly attached to the rear plate 1a. Thus, the tip 51a of the bar code reader 51 is maintained in contact with the upper roller 30.

A guide cap 56 is mounted on a front end of the holder 52 to smoothly guide the upper end of the mixing bag 20 to the tip 51a of the bar code reader 51 when the mixing bag 20 is wound around the upper roller 30. The front surface of the guide cap 56 is convexly projected forward to form a guide surface 56a, and is provided at its center with a hole 56b to allow the tip 51a of the bar code reader 51 to be projected forward. The guide surface 56a has a certain curvature to allow the upper end of the mixing bag 20 to be wound around the upper roller 30 without being caught by the guide surface 56a. However, even though the guide surface 56a of the guide cap 56 is formed to be flat, the guide surface 56a does not hinder the winding of the mixing bag 20. An internally threaded portion (not shown) is formed on a rear end of the guide gap 56 to be combined with an externally threaded portion 52b formed on the front end of the holder 52 so that the guide cap 56 is combined with the holder 52. A lever stopper 54b is formed on a side of the cover 54 to hold a rear end of the lever 60 shown in FIGS. 5 and 6 so that the cover 54 and the holder 52 are longitudinally moved by the lever 60 operated in conjunction with the door 2 with the bracket 53 kept stationary.

FIG. 8 is a sectional view showing the assembled bar code scanner 50. As shown in FIG. 8, in the bar code scanner 50, the bracket 53 is fixedly attached to the rear plate 1a by screws. The holder 52 combined at its rear end with the cover 54 is inserted into the bracket 53 with the coil spring 55 disposed around its outer surface. Also, in the bar code scanner 50, the externally threaded portion 52b formed on the front end of the holder 52 is interlocked with the internally threaded portion formed on the rear end of the guide gap 56.

In a state in which the component parts are assembled into the bar code scanner 50, the coil spring 55 is elastically supported by an outward protrusion 56c of the guide cap 56 and an inward protrusion 53b of the bracket 53. Thus, the holder 52 accommodating the bar code reader 51 is biased toward the upper roller 30 by the coil spring 55 to allow the tip 51a of the bar code reader 51 to be brought into tight contact with the upper roller 30. Meanwhile, when rearward force is applied to the cover 54 by the lever 60, the coil spring 55 is compressed while the holder 52 is moved rearward, thereby removing the tip 51a of the bar code reader 51 from the upper roller 30.

Figure 9:
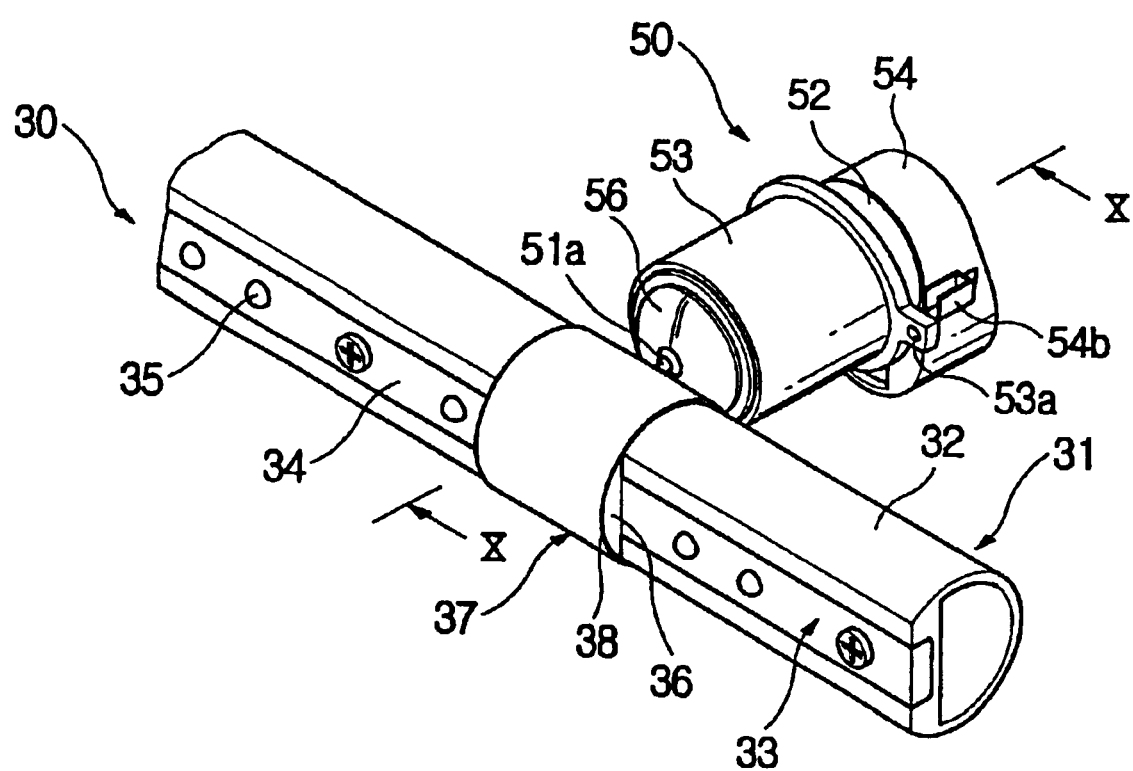
FIG. 9 is a perspective view showing an upper roller and the bar code scanner in contact with the upper roller, according to an embodiment of the present invention.

FIG. 9 is a perspective view showing an upper roller 30 and the bar code scanner 50 in contact with the upper roller 30, according to an embodiment of the present invention.

As shown in FIG. 9, the upper roller 30 includes a first member 31 and a second member 33. The first member 31 has an arcuate portion 32. The second member 33 is fitted into a side of the first member 31 opposite to the arcuate portion 32 to form a flat portion 34. The upper roller 30 generally has a D-shaped section. The first member 31 is made of relatively light metal such as aluminum. The second member 33 is made of synthetic resin and fastened into the first member 31 by screws. A plurality of fixing projections 35 are formed on the second member 33 to be inserted into fixing holes 23 formed in the mixing bag 20. However, the upper roller 30 may be fabricated of a single member as long as the same shape and structure thereof are maintained.

An arcuate guide section 36 is formed on part of the flat portion 34 of the second member 33 to form a circular track 37 together with the arcuate portion 32 of the first member 31. The circular track 37 with which the bar code scanner 50 comes in contact is made to be circular by the arcuate guide section 36 and corresponding part of the arcuate portion 32 of the first member 31. With this construction, when the second member 33 is brought into contact with the bar code scanner 50, boundaries of the flat portion 34 are prevented from interfering with contact between the bar code scanner 50 and the upper roller 30.

A pad 38 made of a material having thin thickness and elasticity is attached to the circular track 37 so that the first and second members 31 and 33, respectively, are prevented from being worn out by direct contact between the first and second members 31 and 33, respectively, and the tip 51a of the bar code scanner 50. Additionally, the pad 38 absorbs vibration caused by the rotation of the upper roller 30 while the bar code 24 is read so that the tip 51a of the bar code scanner 50 remains in contact with the circular track 37 without being removed from the circular track 37.

Figure 10A:
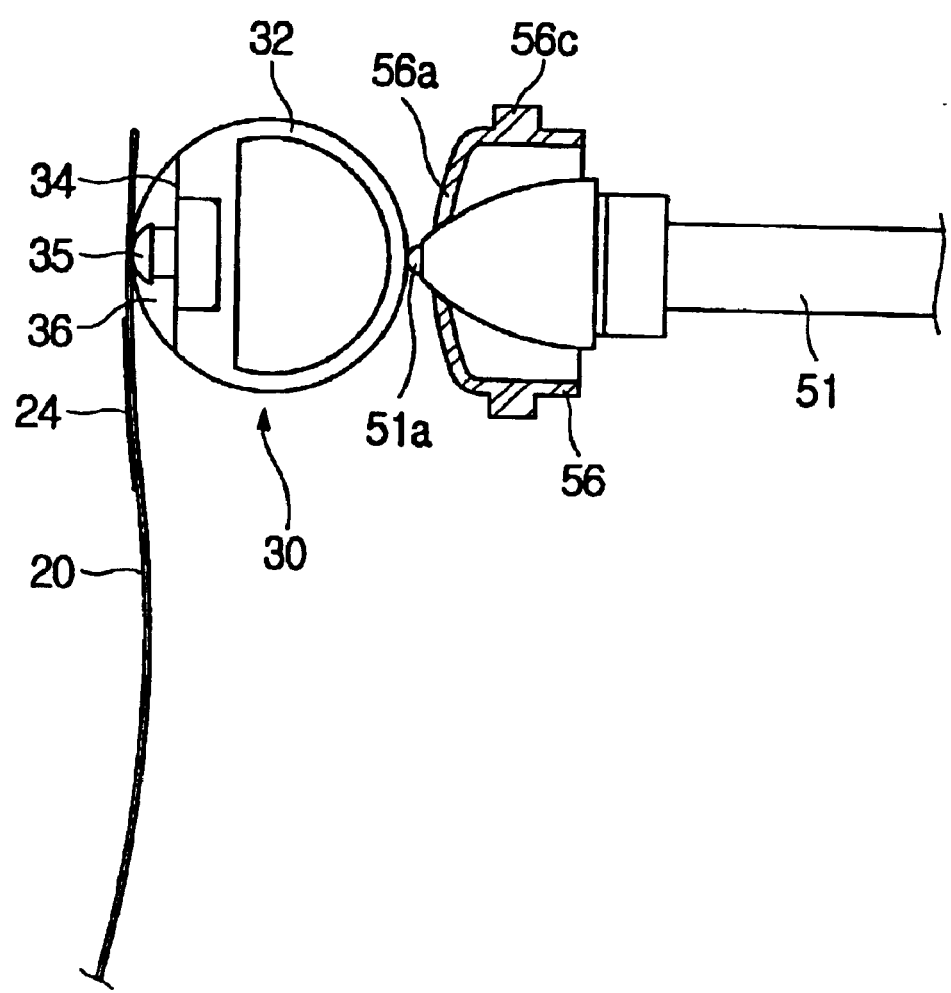
Figure 10B:
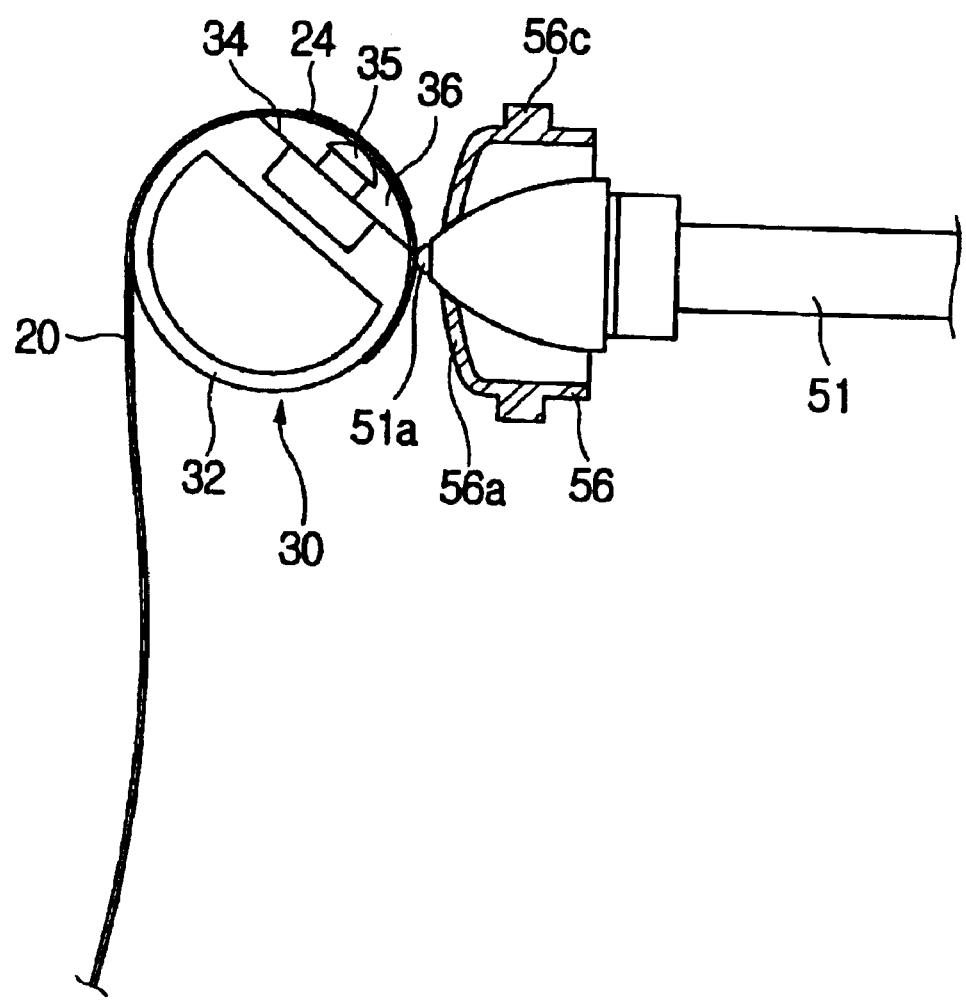

FIGS. 10A and 10B are views showing an operation in which while the door 2 is open, the upper roller 30 is rotated and, at the same time, the bar code 24 attached to the mixing bag 20 is read by the bar code scanner 50. FIG. 10A is a view showing a state in which the mixing bag 20 with the bar code 24 comes in contact with the upper roller 30 that does not start to rotate. FIG. 10B is a view showing a state in which the bar code 24 attached to the mixing bag 20 is brought into contact with the bar code scanner 50.

As shown in FIG. 10A, when the upper roller 30 stops, the mixing bag 20 is situated in contact with the upper roller 30. Thereafter, when the upper roller 30 is rotated in a forward direction (a clockwise direction), the upper end of the mixing bag 20 is moved along an outer surface of the upper roller 30, passed through the bar code scanner 50, and wound around the outer surface of the upper roller 30. In this case, a portion of the mixing bag 20 to which the bar code 24 is attached, is moved along and wound around the circular track 37 formed on the upper roller 30. In a course of movement of the mixing bag 20, the upper end of the mixing bag 20 is guided to the tip 51a of the bar code reader 51 by the guide cap 56 so that the bar code 24 is passed through the bar code scanner 50 while being in contact with the bar code scanner 50.

Meanwhile, the upper roller 30 cannot be rotated around its rotational axis in a perfect circle so the upper roller 30 undergoes eccentric rotation, thereby causing slight vibration of the upper roller 30 and, accordingly, hindering the bar code 24 from being correctly read. Additionally, when external impact is applied to the bread maker, the bar code scanner 50 is momentarily taken off the upper roller 30.

In this case, since the pad 38, which absorbs such vibration and impact, is attached to the circular track 37 of the upper roller 30, the bar code 24 is passed through the bar code scanner 50 while being in contact with the bar code scanner 50.

Figure 11:
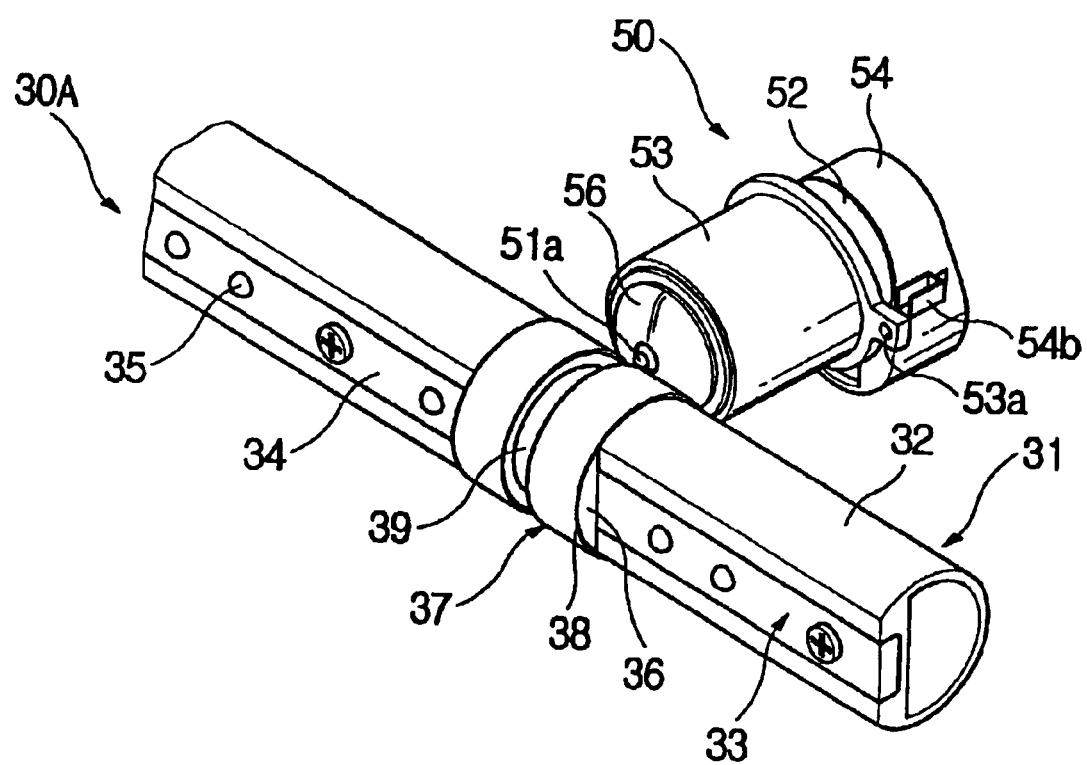
FIG. 11 is a view corresponding to FIG. 9 showing an upper roller and the bar code scanner in contact with the upper roller, according to an embodiment of the present invention.

FIG. 11 is a view corresponding to FIG. 9, which shows an upper roller 30A and the bar code scanner 50 in contact with the upper roller 30A, according to another embodiment of the present invention.

The upper roller 30A has the same construction as the upper roller 30 shown in FIG. 9 except that a circular groove 39 is formed along a centerline of the circular track 37 around which the bar code 24 of the mixing bag 20 is wound. Therefore, only the construction and operation of the circular groove 39 are described herein below.

The circular groove 39 having a certain width and depth is shaped to form a hollow circular ring in the centerline of the circular track 37. The tip 51a of the bar code scanner 50 is situated at a position opposite to the groove 39. When the door 2 is opened to read the bar code 24 (see FIG. 6), the tip 51a of the bar code scanner 50 is situated at a position corresponding to a surface of the circular track 37. Accordingly, the tip 51a of the bar code scanner 50 faces the circular groove 39 while being spaced apart from a surface of the circular groove 39 by the depth of the circular groove 39.

Figure 12:
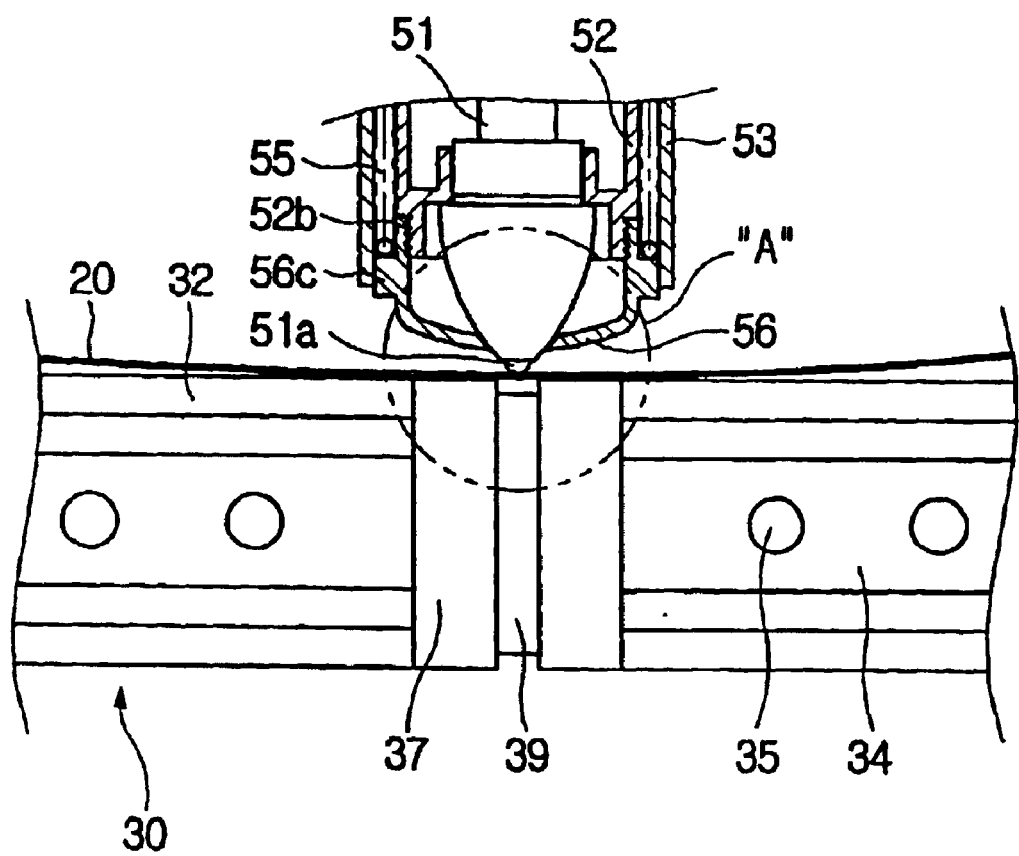
FIG. 12 is a partial sectional view of FIG. 11 showing a function of a groove formed around a roller.
Figure 13:
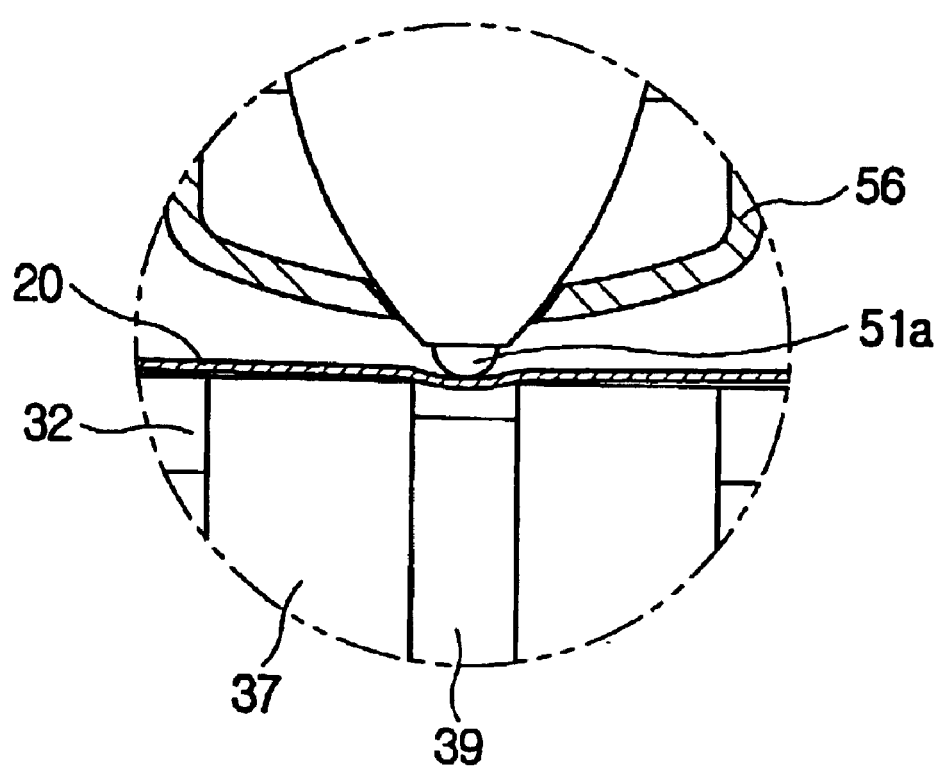
FIG. 13 is an enlarged view of portion "A" of FIG. 12.

FIG. 12 is a partial sectional view of FIG. 11 showing a function of the circular groove 39 formed around a roller. FIG. 13 is an enlarged view of portion "A" of FIG. 12. As shown in FIGS. 12 and 13, when the mixing bag 20 is wound around the upper roller 30A by a rotation of the upper roller 30A, the bar code 24 of the mixing bag 20 is moved along and wound around the circular track 37. Here, the tip 51a of the bar code scanner 50 reads the bar code 24 while being in contact with the bar code 24 and being spaced apart from the circular groove 39 by a certain distance.

As described above, the tip 51a of the bar code scanner 50 reads the bar code 24 while being spaced apart from the upper roller 30A by the circular groove 39. Accordingly, even though vibration caused by the rotation of the upper roller 30A or impact occurs, the bar code scanner 50 is not taken off the bar code 24 and is maintained in tight contact with the bar code 24, thereby stably reading the bar code 24.

For example, the bar code scanner 50 reads the bar code 24 with its tip 51a positioned over the circular groove 39 in the circular track 37. Thus, the bar code scanner 50 is spaced apart from the upper roller 30A by a distance corresponding to the depth of the circular groove 39, and brought into tight contact with the bar code 24. Accordingly, when the vibration of the upper roller 30A or external impact occurs, the mixing bag 20 made of an elastic material is pushed toward the circular groove 39 by the tip 51a of the bar code scanner 50. As the vibration or impact is absorbed by a cushion action of air in the circular groove 39 and a self-elasticity of the mixing bag 20, the tip 51a of the bar code scanner 50 is maintained in tight contact with the bar code 24. In addition, the upper roller 30A is kept spaced apart from the bar code scanner 50 so that wearing of the upper roller 30A does not occur.

Although the bar code 24 is described as being read by the bar code scanner 50 while being wound around the upper roller 30A, the lower roller 40 may be fabricated to have the same construction as that of the above-described upper roller 30A and the bar code scanner 50 may be situated to face the lower roller 40 to obtain the same operational effect.

As described above, the present invention provides a bread maker with a bar code scanner in which the bar code scanner has a construction that reads the bar code through direct contact with the bar code, thereby allowing products to be fabricated at a low cost. In addition, an upper roller, around which the bar code is wound, is provided with a circular track and a vibration and impact absorbing element. Therefore, the bar code may be correctly read by the bar code scanner even though vibration or impact occurs so that a bread making operation precisely coinciding with bar code information is performed.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A bread maker, comprising:
    upper and lower rollers to wind a mixing bag containing bread ingredients to form dough; and
    a bar code scanner to read a bar code attached to the mixing bag so that, as the mixing bag is wound by rotation of the upper and lower rollers, the bar code scanner reads the bar code while physically contacting the bar code wound around one of the upper and lower rollers.

2. The bread maker according to claim 1, wherein the upper roller comprises:
    flat and arcuate portions, the flat portion being provided with an arcuate guide section to form a circular track together with the arcuate portion so that the bar code is guided along the circular track provided on the upper roller, and brought into contact with and passed through the bar code scanner.

3. The bread maker according to claim 2, further comprising:
a pad attached to the circular track to prevent wearing of the circular track caused by contact with a front end of the bar code scanner, and to absorb vibration caused by rotation of the upper roller so that smooth contact is allowed between the bar code and the bar code scanner.

4. The bread maker according to claim 2, wherein the circular track is provided with a ring-shaped groove so that the bar code is brought into contact with the bar code scanner while being spaced apart from the upper roller by the ring-shaped groove.

5. The bread maker according to claim 2, wherein the bar code scanner comprises:
a bar code reader to read the bar code, the bar code reader being provided at a front end thereof with a tip to be brought into point contact with the bar code.

6. The bread maker according to claim 5, wherein the bar code scanner further comprises:
a holder having a hollow cylindrical shape, to accommodate and support the bar code reader; and
a bracket having a hollow cylindrical shape, to accommodate the holder to be longitudinally moved a certain distance therein.

7. The bread maker according to claim 6, wherein the bar code scanner further comprises:
a guide cap disposed in front of the bar code reader to guide the bar code to the tip of the bar code reader.

8. The bread maker according to claim 7, wherein the guide cap is screwed on a front end of the holder.

9. The bread maker according to claim 7, further comprising:
a coil spring interposed between the bracket and the holder to bias the bar code so as to be brought into tight contact with the upper roller.

10. The bread maker according to claim 7, wherein the bar code scanner further comprises:
a cover interlocked with a rear end of the holder to protect and surround a rear end portion of the bar code reader.

11. The bread maker according to claim 10, further comprising:
a housing and a door to selectively open and close a front of the housing, wherein the cover is provided at one end thereof with one or more locking projections, and the housing is interlocked at a first end of the housing with the locking projections of the cover and provided at a second end of the housing with a lever to be moved forward and rearward by an operation of the door, thereby allowing the bar code reader to be brought into contact with the upper roller when the door is opened, and taken off the upper roller by rearward moving of the cover caused by the lever when the door is closed.

12. The bread maker according to claim 11, further comprising:
a rear plate in which the bar code scanner is fixedly attached, positioned in a rear portion of an interior of the housing, thereby allowing the bar code scanner to be selectively brought into contact with and removed from the upper roller by the lever.

13. The bread maker according to claim 7, wherein the guide cap is provided with a hole at a center of the guide cap to allow the tip of the bar code reader to be projected forward, and a curved-shaped guide surface formed on a front of the guide cap to allow the mixing bag to wind around the upper roller without being caught by the guide surface.

14. A bread maker, comprising:
a housing and a door, the door selectively opening and closing a front of the housing;
a plurality of heaters mounted on the door;
a baking tray and a scraper provided in the housing;
an upper and lower roller to wind a mixing bag containing bread ingredients to form dough; and
a bar code scanner to read a bar code attached to the mixing bag so that, as the mixing bag is wound by rotation of the upper and lower rollers, the bar code scanner reads the bar code while physically contacting the bar code wound around one of the upper and lower rollers.

15. The bread maker according to claim 14, wherein one of the upper roller or the lower roller further comprises:
a first member having an arcuate portion and a second member having a flat portion, the flat portion being provided with an arcuate guide section to form a circular track together with the arcuate portion so that the bar code is guided along the circular track, and brought into contact with and passed through the bar code scanner.

16. The bread maker according to claim 15, further comprising:
a vibration and impact absorbing element attached to the circular track to allow the bar code scanner to correctly read the bar code when vibration or impact to the bread maker occurs.

17. The bread maker according to claim 15, wherein the circular track is provided with a circular groove along a centerline of the circular track around which the bar code and the mixing bag is wound.

18. The bread maker according to claim 16, wherein the vibration and impact absorbing element is attached to the circular track to prevent the first and second members from being worn.

* * * * *